(12) United States Patent  
van Diggelen

(10) Patent No.: US 6,417,801 B1  
(45) Date of Patent: Jul. 9, 2002

(54) METHOD AND APPARATUS FOR TIME-FREE PROCESSING OF GPS SIGNALS

(75) Inventor: Frank van Diggelen, San Jose, CA (US)

(73) Assignee: Global Locate, Inc., San Jose, CA (US)

( * ) Notice: Subject to any disclaimer, the term of this patent is extended or adjusted under 35 U.S.C. 154(b) by 0 days.

(21) Appl. No.: 09/715,860

(22) Filed: Nov. 17, 2000

(51) Int. Cl.⁷ .............................. G01S 5/02; H04B 7/185
(52) U.S. Cl. .......................... 342/357.08; 342/357.09; 342/357.1
(58) Field of Search ................. 342/357.02, 357.08, 342/357.09, 357.1; 701/214

(56) References Cited

U.S. PATENT DOCUMENTS

| | | | |
|---|---|---|---|
| 5,736,960 A | * 4/1998 | Murphy et al. | |
| 5,841,396 A | 11/1998 | Krasner | 342/357 |
| 5,874,914 A | 2/1999 | Krasner | 342/357 |
| 5,893,044 A | * 4/1999 | King et al. | 701/214 |
| 5,945,944 A | 8/1999 | Krasner | 342/357.06 |
| 6,052,081 A | 4/2000 | Krasner | 342/357.02 |
| 6,064,336 A | 5/2000 | Krasner | 342/357.05 |
| 6,133,874 A | * 10/2000 | Krasner | 342/357.15 |
| 6,150,980 A | * 11/2000 | Krasner | 342/357.1 |
| 6,215,442 B1 | 4/2001 | Sheynblat et al. | 342/357.06 |

* cited by examiner

*Primary Examiner*—Theodore M. Blum  
(74) *Attorney, Agent, or Firm*—Moser, Patterson & Sheridan, LLP

(57) ABSTRACT

A method and apparatus for computing GPS receiver position without using absolute time information transmitted by the satellite or by an alternative source of timing available at the GPS receiver. The GPS receiver is contained in an integrated receiver that also includes a wireless communication transceiver, but does not have access to an accurate source of absolute time information. The wireless transceiver communicates through a wireless network to a server. The GPS receiver measures satellite pseudoranges and uses the wireless communication transceiver to send the pseudoranges to the server. The server fits the pseudoranges to a mathematical model in which the GPS receiver position and the absolute time are unknown parameters. The server then computes a position and absolute time that best fit the model, thus yielding the correct position for the GPS receiver, and the absolute time at which the pseudorange measurements were made.

35 Claims, 7 Drawing Sheets

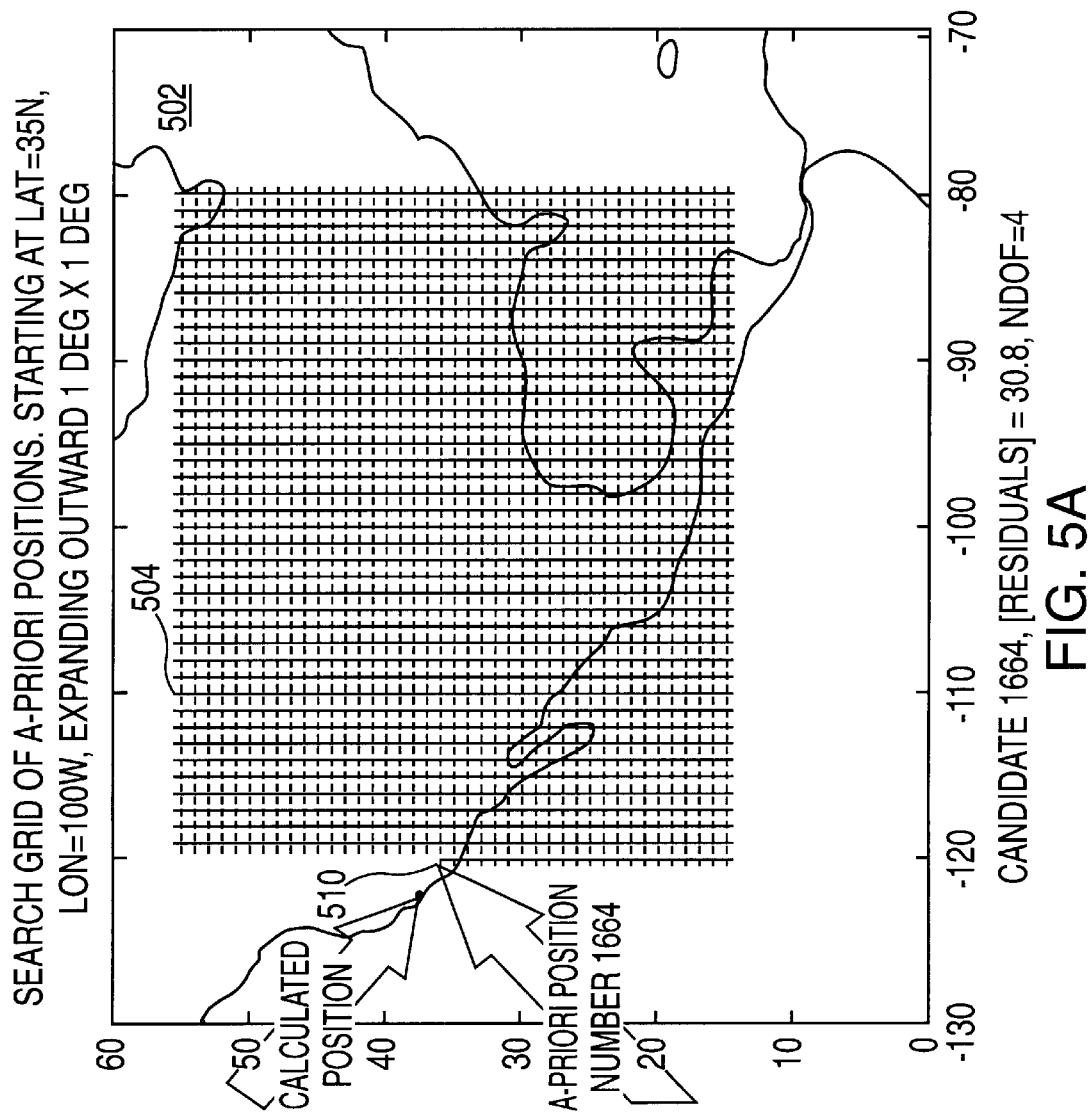

METHOD AND APPARATUS FOR TIME-FREE PROCESSING OF GPS SIGNALS

BACKGROUND OF THE DISCLOSURE

1. Field of the Invention

The invention relates to satellite-based position location and, more particularly, the invention relates to a method and apparatus for time-free processing of global positioning system (GPS) signals.

2. Description of the Background Art

Global Positioning System (GPS) receivers normally determine their position by computing time delays between transmission and reception of signals transmitted from satellites and received by the receiver on or near the surface of the earth. The time delays multiplied by the speed of light provides the distance from the receiver to each of the satellites that are in view of the receiver. The GPS satellites transmit to the receivers satellite-positioning data, so called "ephemeris" data. In addition to the ephemeris data, the satellites transmit to the receiver absolute time information associated with the satellite signal, i.e., the absolute time signal is sent as a second of the week signal. This absolute time signal allows the receiver to unambiguously determine a time tag for when each received signal was transmitted by each satellite. By knowing the exact time of transmission of each of the signals, the receiver uses the ephemeris data to calculate where each satellite was when it transmitted a signal. Finally, the receiver combines the knowledge of satellite positions with the computed distances to the satellites to compute the receiver position.

The process of searching for and acquiring GPS signals, and reading the ephemeris and related data, including absolute time, for a multiplicity of satellites is time consuming and introduces unacceptable delays in computing the receiver position. In addition, in many situations, there may be blockage of the satellite signals. In these cases the received signal level can be too low to demodulate and derive the satellite data without error. However, in these degraded signal situations, the receiver is capable of tracking the satellite signals, and measuring time delays (and hence distance), if an external source of ephemeris and absolute time is available.

Several innovations have been made to provide "GPS Aiding" that consists of external sources of ephemeris (or equivalent) data and absolute time information. The aiding information is transmitted to the GPS receiver using some alternative form of communication (usually wireless, such as cellular data channels). Thanks to the use of GPS Aiding, GPS receivers can operate in areas where signal levels are too low for traditional GPS to function properly.

All GPS Aiding, thus far invented, requires accurate external knowledge of the absolute time, so that the satellite positions can be accurately determined. The absolute time is required to an accuracy of between 1 millisecond and 10 milliseconds. Unfortunately, there are desired implementations of GPS Aiding where absolute time cannot easily be obtained to this accuracy at the GPS receiver. For example: the AMPS cellular phone system does not support time information; nor (currently) does the North American TDMA cellular phone system. The GSM cellular phone system supports timing information, but may have different time references in different geographical regions. In these situations it is desirable to provide a method for computing GPS receiver position without knowing the absolute time.

More specifically, Global Positioning System (GPS) receivers receive GPS signals transmitted from orbiting GPS satellites containing unique pseudo-random noise (PN) codes. The GPS receivers determine the time delays between transmission and reception of the signals by comparing time shifts between the received PN code signal sequence and internally generated PN signal sequences.

Each transmitted GPS signal is a direct sequence spread spectrum signal. The signals available for commercial use are provided by the Standard Positioning Service. These signals utilize a direct sequence spreading signal with a 1.023 MHz spread rate on a carrier at 1575.42 MHz (the L1 frequency). Each satellite transmits a unique PN code (known as the C/A code) that identifies the particular satellite, and allows signals transmitted simultaneously from several satellites to be received simultaneously by a receiver with very little interference of any one signal by another. The PN code sequence length is 1023 chips, corresponding to a 1 millisecond time period. One cycle of 1023 chips is called a PN frame. Each received GPS signal is constructed from the 1.023 MHz repetitive PN pattern of 1023 chips. At very low signal levels the PN pattern may still be observed, to provide unambiguous time delay measurements, by processing, and essentially averaging, many PN frames. These measured time delays are called "sub-millisecond pseudoranges", since they are known modulo the 1 millisecond PN frame boundaries. Once the absolute time delay can be calculated, by resolving the integer number of milliseconds associated with each delay to each satellite, then one has true, unambiguous, pseudoranges. The process of resolving the unambiguous pseudoranges is known as "integer millisecond ambiguity resolution".

A set of four pseudoranges together with a knowledge of the absolute times of transmissions of the GPS signals and satellite positions at those absolute times is sufficient to solve for the position of the GPS receiver. The absolute times of transmission are broadcast from the satellites in the Navigation Message, which is superimposed on the 1.023 MHz PN code at a lower, 50 Hz, data rate. This 50 Hz signal is a binary phase shift keyed (BPSK) data stream with bit boundaries aligned with the beginning of the PN frame. There are exactly 20 PN frames per data bit period (20 milliseconds). The 50 Hz signal contains data bits describing the GPS satellite orbits, satellite clock corrections, time of week information, and other system parameters.

The absolute times associated with the satellite transmissions are determined in conventional GPS receivers by reading the Time of Week (TOW) data in the Navigation Message of the GPS signal. In the standard method of time determination, a conventional GPS receiver decodes and synchronizes to the 50 baud data stream. The 50 baud signal is arranged into 30-bit words grouped into subframes of 10 words, with a length of 300 bits and a duration of six seconds. Five subframes comprise a frame of 1500 bits and a duration of 30 seconds, and 25 frames comprise a superframe with a duration of 12.5 minutes. A superframe contains the complete Navigation Message. The data bit subframes that occur every six seconds contain bits that provide the TOW to six second resolution. The 50 baud data stream is aligned with the C/A code transitions so that the arrival time of a data bit edge (on a 20 ms interval) resolves the absolute transmission time to the nearest 20 milliseconds. Precision synchronization to bit boundaries can resolve the absolute transmission time to one millisecond or less.

The absolute times associated with the satellite signals are determined in Wireless Aided-GPS receivers by having an external timing source that is calibrated to GPS time then using this time to provide a precise time tag at the time of reception of the satellite signal. The time of reception minus the pseudorange gives the absolute time of transmission for each satellite (with the pseudorange expressed in time units, reflecting the transmission-reception time delay).

The absolute times of transmission are needed in order to determine the positions of the satellites at the times of transmission and hence to determine the position of the GPS receiver. GPS satellites move at approximately 3.9 km/s, and thus the range of the satellite, observed from the earth, changes at a rate of at most ±800 m/s. Absolute timing errors result in range errors of up to 0.8 m for each millisecond of timing error. These range errors produce a similarly sized error in the GPS receiver position. Hence, absolute time accuracy of 10 ms is sufficient for position accuracy of approximately 10 m. Absolute timing errors of much more than 10 ms will result in large position errors, and so typical GPS receivers have required absolute time to approximately 10 millisecond accuracy or better.

Note that absolute timing errors also introduce errors as a result of the GPS satellite clock drift, but these are so much smaller than the satellite position error that they can be ignored for the purposes of this explanation (GPS clocks drift typically less than 0.1 nanoseconds per second, and the observed range to the satellite is affected by the GPS clock drift multiplied by the speed of light, this error is less than 0.03 m/s, about 25 thousand times smaller than errors caused by changes in satellite position).

There is another time parameter closely associated with GPS positioning, this is the sub-millisecond offset in the time reference used to measure the sub-millisecond pseudorange. This offset affects all the measurements equally, and for this reason it is known as the "common mode error".

The common mode error should not be confused with the absolute time error. As discussed above, an absolute time error of 1 millisecond leads to range errors of up to 0.8 meters while an absolute time error of 1 microsecond would cause an almost unobservable range error of less than 1 millimeter. However, a common mode error of 1 microsecond causes a pseudorange error of 1 microsecond multiplied by the speed of light, that is 300 meters.

Because common mode errors have such a large effect on pseudoranges, and because it is practically very difficult to calibrate the common mode error, traditional GPS receivers treat the common mode error as an unknown that must be solved for, along with position, once sufficiently many pseudoranges have been measured at a particular receiver. However, no traditional GPS receivers solve for absolute time error instead relying on the fact that they know absolute time to the required accuracy (of 10 milliseconds or better).

Therefore, a need exists in the art for a method and apparatus that processes GPS signals without using absolute time.

SUMMARY OF THE INVENTION

The present invention is a method and apparatus for computing GPS receiver position without using absolute time information transmitted by a satellite or by an alternative source of timing available at the GPS receiver. In an embodiment of the invention, the GPS receiver is contained in an integrated receiver that also includes a wireless communication transceiver, but does not have access to an accurate source of absolute time information. The wireless transceiver communicates through a wireless network to a server. The GPS receiver measures satellite pseudoranges and uses the wireless communication transceiver to send the pseudoranges to the server. The server fits the pseudoranges to a mathematical model in which the GPS receiver position and the absolute time are unknown parameters. The server then computes a position and absolute time that best fit the model, thus yielding the correct position for the GPS receiver, and the absolute time at which the pseudorange measurements were made.

BRIEF DESCRIPTION OF THE DRAWINGS

The teachings of the present invention can be readily understood by considering the following detailed description in conjunction with the accompanying drawings, in which:

FIGS. 5A and 5B graphically depict a grid (5A) used for producing the residual magnitudes (5B) of position error.

To facilitate understanding, identical reference numerals have been used, where possible, to designate identical elements that are common to the figures.

DETAILED DESCRIPTION

The invention is a method and apparatus for determining position and time in a global positioning system (GPS) without having access, at the GPS receiver, to absolute time information. In the following description, for purposes of explanation, numerous specific details are set forth in order to provide a thorough understanding of the present invention. It will be evident, however, to one skilled in the art that the present invention may be practiced without these specific details.

Figure 1:
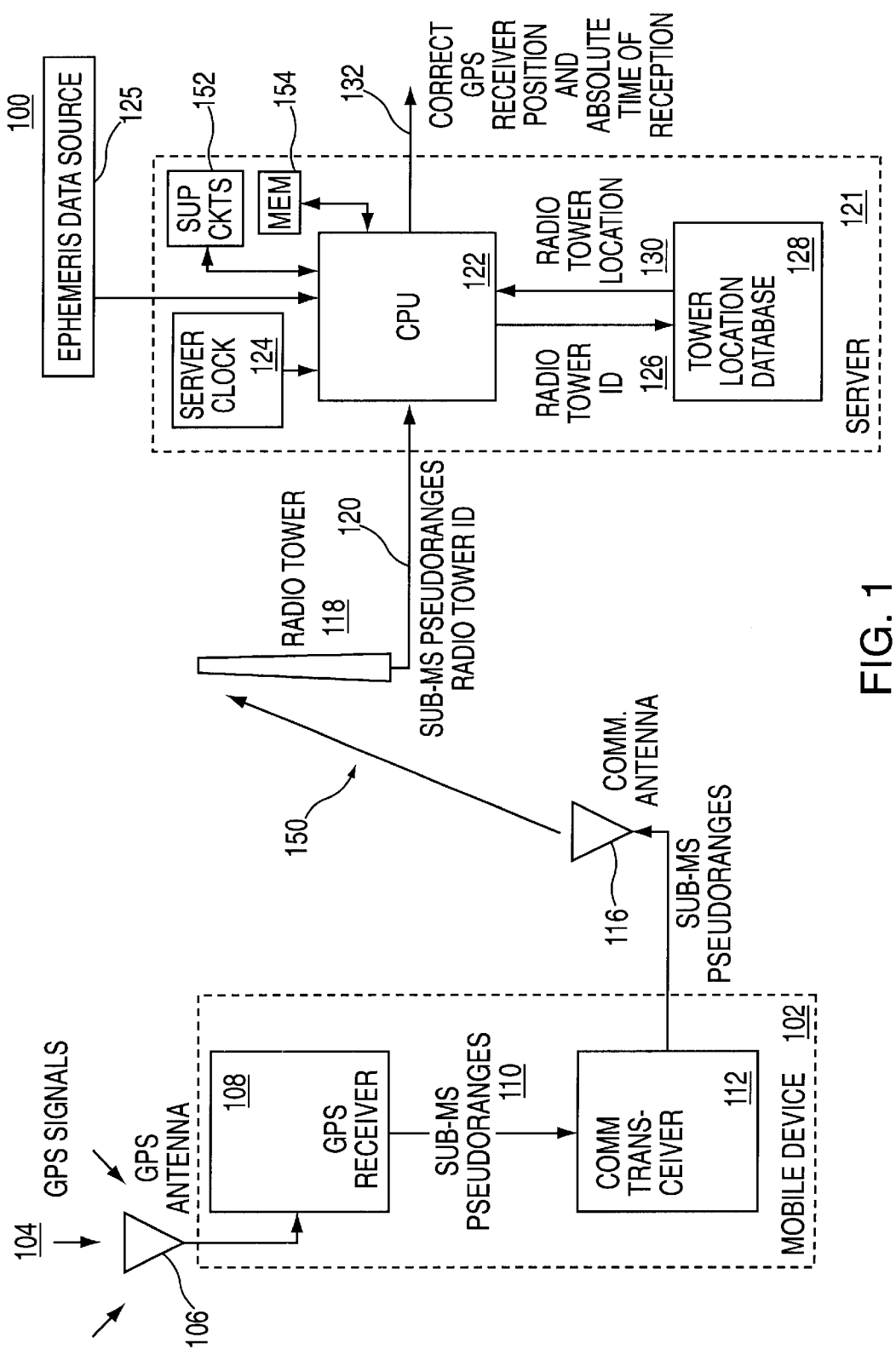
FIG. 1 depicts a block diagram of apparatus for computing a GPS receiver location without knowledge of absolute time.

FIG. 1 depicts one embodiment of the present invention comprising an integrated mobile receiver 102 coupled to a server 121 via a wireless link 150. A GPS receiver 108 is contained in the integrated receiver 102 along with a wireless communication transceiver 112. The GPS receiver 108 measures only sub-millisecond pseudoranges with respect to GPS satellites that are in view of the receiver 108, and then sends these sub-millisecond pseudo-ranges to a server 121 using a wireless communication link 150. The server 121 forms an approximate, a-priori estimate of the GPS receiver position from the known location of a wireless tower 118 used to receive the wireless communication. The server 121 also allocates a time tag from its own real time clock, thus creating an a-priori estimate of the absolute time at which the GPS receiver 108 received the GPS signals from the satellites. If the a-priori position is within 100 km of the true position, and the a-priori absolute time of reception is within one minute of the true (unknown) time of reception, then the server 121 can resolve the integer milliseconds, thus turning the sub-millisecond pseudoranges into true pseudoranges.

Next, the server 121 uses the pseudoranges to solve for the unknown receiver position and absolute time. The server comprises a central processing unit (CPU) 122, a server clock 124, a tower location database 128, CPU support circuits 152, and memory 154. The support circuits comprise well-known circuits that facilitate operation of the CPU such as clock circuits, cache, power supplies, I/O interface circuits, and the like. The memory 154 may be random access memory, read only memory, removable storage, hard disk storage, or any combination of these memory devices.

In one embodiment of the invention, the common mode error is assumed to be totally unknown at the server 121. In the one embodiment of the invention, the server 121 assumes an a-priori common mode error of zero, although it will be understood that any other a-priori common mode error could be used, with no change in the results. With the five a-priori estimates of the unknown parameters (3 coordinates of position, 1 absolute time, 1 common mode error) the server 121 creates a mathematical model relating the measured pseudoranges and a-priori information to the unknown parameters. The mathematical model can be written as a linear equation, which, when solved, yields the correct position and absolute time.

More specifically, GPS signals 104 from a plurality of satellites (not shown) are received at the GPS antenna 106. The received signals are coupled to the GPS receiver 108. The GPS receiver 108 processes the GPS signals to form sub-millisecond pseudoranges on path 110, which are coupled to the communication transceiver 112 and transmitted from the communication antenna 116 through a wireless network such as a cellular telephone network. The transmission from the integrated receiver 102 is received by a nearby radio tower 118, e.g., a cellular telephone tower. The sub-millisecond pseudoranges and the radio tower ID are sent from said radio tower 118 to the server 121. In the server 121 the server clock 124 is used to provide a time-tag when the sub-millisecond pseudoranges are received at the server. The server 121 passes the radio tower ID along path 126 to a tower location database 128, and extracts a location for the tower from the database 128. The tower location is coupled to the CPU 122 along path 130.

The satellite ephemeris data, for all satellites represented by the sub-millisecond pseudorange data, is provided to the server from some external source 125 (such as another GPS receiver located in the vicinity of the server with a clear view of the sky, or some other source such as a network of GPS receivers). Note that, for simplicity, the term "ephemeris" is used to mean the satellite orbital parameters, as well as the satellite clock parameters. The CPU 122 of the server 121 combines the sub-millisecond pseudoranges, radio tower location, server time, and ephemeris to form the correct GPS receiver position and absolute time of reception of signals at the GPS receiver 108.

The apparatus above assumes that the GPS receiver 108 is not capable of reliably receiving the absolute time information and ephemeris data, i.e., the GPS receiver is used indoors, such that the processing of ephemeris data is accomplished in the server 121. However, in some instances, rather than having the pseudo range data supplied to the server, the server (or some other source) can supply the ephemeris data and clock signal to the mobile device 102 and the mobile device can perform the position calculation. In such an embodiment of the invention, a CPU and clock (similar to 122 and 124) are located in the mobile device 102 to facilitate signal processing in the same manner as is described with respect to the server 121.

Figure 2:
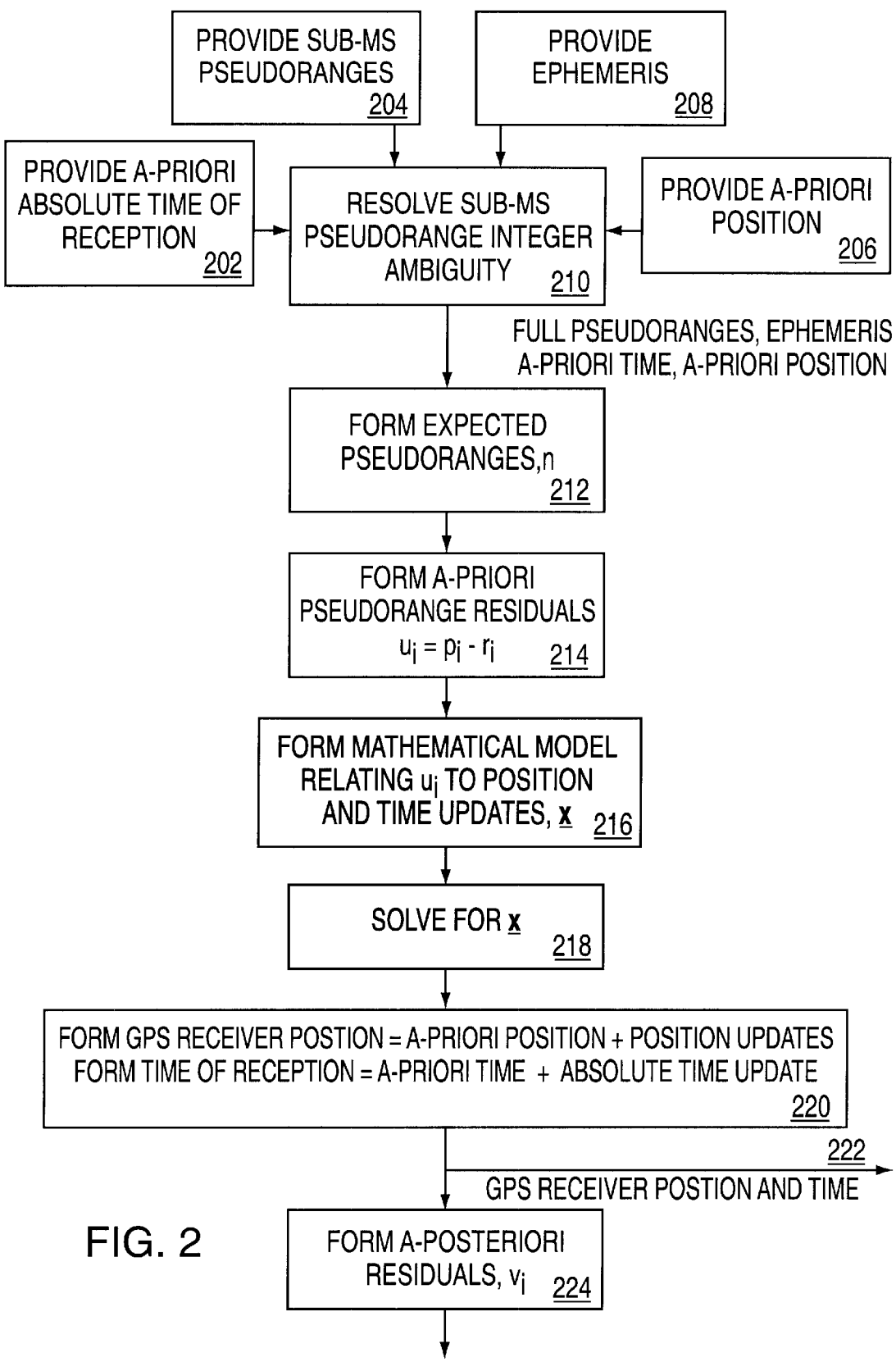
FIG. 2 depicts a flow diagram representing the operation of the apparatus of FIG. 1.

FIG. 2 is a flowchart illustration of the process 200 that is performed by the server CPU 122 of FIG. 1. At step 202, the server clock signal is used to provide an a-priori estimate of the absolute time of reception of the GPS signals at the GPS receiver. It will be understood that the use of the server clock is one embodiment used to exemplify the current invention and, in general, the a-priori estimate of time could come from a time source other than the server clock. The present invention is applicable irrespective of the source, or quality, of the a-priori estimate of absolute time. To simplify the exposition, this particular embodiment is assumed to have a server clock that provides a time tag within one minute of the actual absolute time of reception of the GPS signals at the GPS receiver. It will be understood that this simplifying assumption, while often true in practice, is not a necessary part of the invention, and has been used here only to simplify the explanation of the invention. Later in this specification, this simplifying assumption is removed.

At step 206, the tower location is provided to the CPU as an a-priori estimate of the GPS receiver position. It will be understood that the use of the tower location is just one embodiment of any number of a-priori positions that could be used (for example: a previously calculated position for the same GPS receiver 108 could be used as an a-priori position, or a combination of positions of recently used towers, or the a-priori position could simply be guessed). The present invention is applicable irrespective of the source, or quality, of that a-priori position. To simplify the exposition, this particular embodiment is assumed to have an a-priori position that is within 100 km of the true position of the GPS receiver 108. It will be understood that this simplifying assumption, while often true in practice, is not a necessary part of the invention, and has been used here only to simplify the explanation of the invention. Later in this specification this simplifying assumption is removed.

At step 204 and 208, the sub-millisecond pseudoranges and ephemeris for the appropriate satellites that are in view of GPS receiver are also provided as inputs to the process 200.

At step 210, the sub-millisecond pseudorange integers are resolved by a process described below with respect to FIG. 3. Having resolved the sub-millisecond pseudorange integers, the process creates full pseudoranges.

At step 212, the expected pseudoranges are formed. These expected pseudoranges are the pseudoranges that would be measured if all the a-priori parameters (a-priori position, a-priori absolute time of measurement, and a-priori common mode error) were in fact the actual values of these parameters. The expected pseudoranges are denoted $r_i$, the index i denotes the appropriate satellite.

At step 214, the a-priori pseudorange residuals are formed, these residuals are defined as the difference between the measured pseudoranges (denoted $\rho_i$) and the expected pseudoranges ($r_i$). The a-priori pseudorange residuals are denoted $u_i$.

At step 216 a mathematical model is formed, relating u to x, where $\underline{u}$ is a vector of $u_i$ and $\underline{x}$ is a vector of the updates to the a-priori values of position, common-mode error, and absolute time of reception:

$$\underline{u} = \begin{bmatrix} u_1 \\ u_2 \\ \vdots \\ u_n \end{bmatrix},$$

where n is the number of pseudoranges. The pseudoranges are expressed in units of length (e.g. meters).

$$\underline{x} = \begin{bmatrix} x \\ y \\ z \\ t_C \\ t_S \end{bmatrix}.$$

The position updates, x, y, z, are expressed in units of length (e.g. meters) and the time updates $t_c$, $t_s$ are in units of time (e.g. seconds)

An embodiment of a mathematical model relating these two vectors is a Taylor series, where the first term in the series is the first derivative of $\underline{u}$ with respect to $\underline{x}$, the second term contains the second derivative, and so on. In one embodiment of the process, the invention uses a linearized model that keeps only the first derivative in the Taylor series. This gives the following equation relating $\underline{u}$ to $\underline{x}$:

$$\underline{u} = \begin{bmatrix} u_1 \\ \vdots \\ u_n \end{bmatrix} = \begin{bmatrix} \partial \rho_1/\partial x & \partial \rho_1/\partial y & \partial \rho_1/\partial z & \partial \rho_1/\partial t_C & \partial \rho_1/\partial t_S \\ \vdots & \vdots & \vdots & \vdots & \vdots \\ \partial \rho_n/\partial x & \partial \rho_n/\partial y & \partial \rho_n/\partial z & \partial \rho_n/\partial t_C & \partial \rho_1/\partial t_S \end{bmatrix} \begin{bmatrix} x \\ y \\ z \\ t_C \\ t_S \end{bmatrix}$$

$$= \begin{bmatrix} \partial \rho_1/\partial x & \partial \rho_1/\partial y & \partial \rho_1/\partial z & c & -\dot{\rho}_1 \\ \vdots & \vdots & \vdots & \vdots & \vdots \\ \partial \rho_n/\partial x & \partial \rho_n/\partial y & \partial \rho_n/\partial z & c & -\dot{\rho}_n \end{bmatrix} \begin{bmatrix} x \\ y \\ z \\ t_C \\ t_S \end{bmatrix}$$

$$= H\underline{x}$$

The particular values of $\partial \rho_i/\partial x$, $\partial \rho_i/\partial y$, and $\partial \rho_i/\partial z$ depend on the coordinate system used to describe the a-priori position. These terms in the first three columns of the matrix H are well known in the art, and further explanation is not required. The fourth column of the matrix is c, the speed of light, this part of the model is also standard in the art. The novel aspect of this invention requires the inclusion of the fifth column in the matrix. This fifth column exactly models the relationship between the unknown error in the a-priori estimate of absolute time, and the measured pseudoranges. Furthermore the terms in this column are the rate of change of the pseudoranges with respect to time and can be exactly calculated from the ephemeris data. Hence every term in the matrix H is known and, provided there are five or more pseudoranges available at the GPS receiver, the values of $\underline{x}$ can be calculated using linear algebra.

At step 220, the GPS receiver position is computed by adding the updates x,y,z, to the a-priori position, and the absolute time of reception is formed by adding the update $t_s$ to the a-priori time of reception. If the a-priori position and a-priori absolute time were close enough to the true position and true absolute time, then one pass through the process 200 will yield results to the required accuracy. However, if the first pass through the process 200 does not immediately converge on the required accuracy, then the result 222 is used to form a new a-priori time of reception estimate for step 202 and a new a-priori position estimate for step 206, and the process 200 is repeated until the result converges on the correct result (typically very few iterations are required because the linearization using the first order Taylor series is a very good mathematical description of the complete, non-linear, system, thanks to the fact that the satellite ranges are so much further from the earth than the error in the a-priori position). It will be understood that the Taylor series is just one example of a mathematical model relating the unknown position and absolute time to the measured pseudoranges. The present invention is equally valid with other models, such as non-linear models, which can be solved through techniques such as iteratively fitting the unknown parameters until an acceptable solution is obtained.

If, as assumed above, the a-priori position and a-priori absolute time are within 100 km and 1 minute respectively, then the result 222 will be correct. However, if the a-priori position and time are not known within these limits, then the incorrect integers may be formed at step 210 and the incorrect result 222 may be obtained. In this case the a-posteriori residuals, formed at step 224, will be used, as described below with respect to FIG. 4, to detect this errant condition and then different a-priori values will be used.

Figure 3:
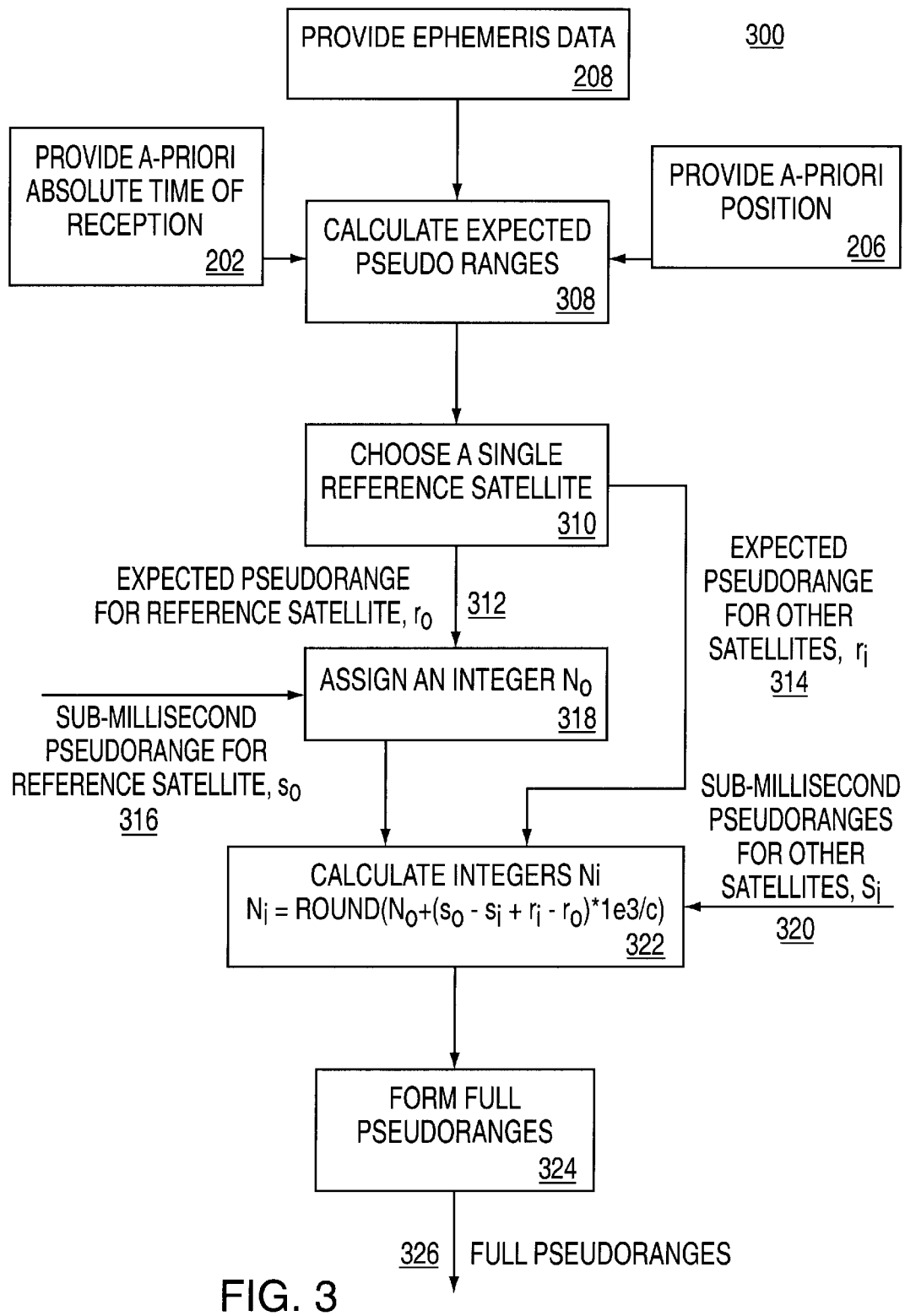
FIG. 3 depicts a flow diagram representing a method of computing pseudoranges in accordance with the invention.

FIG. 3 is a flowchart of an illustrative process 300 that resolves the sub-millisecond pseudorange integers (step 210 of FIG. 2). To simplify the exposition, this particular embodiment is assumed to have an a-priori position that is within 100 km of the true position of the GPS receiver, and an a-priori absolute time estimate that is within one minute of the true absolute time of reception at the GPS receiver. It will be understood that these simplifying assumptions, while often true in practice, are not a necessary part of the invention, and have been used here only to simplify the explanation of this embodiment of the invention. In the description relating to FIG. 4, FIG. 5, and FIG. 6, these simplifying assumptions are removed.

At step 308, the process 300 calculates the expected pseudoranges using ephemeris data (provided in step 208) for the satellites along with the a-priori absolute time of reception (provided in step 202) and the a-priori position (provided in step 206). As done throughout this specification, the term ephemeris is used to mean the satellite orbital parameters as well as the satellite clock parameters.

At step 310, a single satellite is chosen as a reference satellite. In the preferred embodiment the satellite with the highest elevation angle (from the a-priori position) is chosen as the reference, but it will be understood that it is not important which satellite is used as the reference. The expected pseudorange for the reference satellite is denoted $r_0$ (path 312). The expected pseudoranges for the other satellites are denoted $r_i$ (path 314).

At step 318, an integer is assigned to the reference satellite. The integer must satisfy the equation:

$$N_0 * c/10^3 + s_0 + t_c = r_0 - e_0,$$

where c is the speed of light, expressed in m/s, $t_c$ is the common mode error, and $e_0$ is the error in the expected pseudorange introduced by the combined errors in the a-priori position and a-priori absolute time.

Those skilled in the art will understand that an arbitrary integer may be assigned, since in the following discussion it is seen that the common mode error will absorb any errors made in this integer, as long as exactly equal errors are made in all the other integers. The integer $N_0$ is assigned according to the following equation:

$$N_0 = \text{round}\ ((r_0 - s_0) * 10^3/c).$$

At step 322, the integer millisecond values for the remaining satellites are calculated using the sub-millisecond pseudoranges 320 for all the satellites along with $N_0$. Whatever value of $N_0$ was chosen above implies an associated common mode error $t_c$. The values of $N_i$ are chosen to satisfy the following equation, which relates $N_i$, the measured sub-millisecond pseudorange ($s_i$), the expected pseudorange ($r_i$), and the common mode error ($t_c$)

$$N_0*c/10^3+s_i-t_c=r_i-e_i,$$

where, $e_i$ is the error in the expected pseudorange introduced by the combined errors in the a-priori position and a-priori absolute time. In the preferred approach, the corresponding equation for $N_0$ is subtracted from the above equation, this exactly cancels the term $t_c$, since this term is common (by definition) for all satellites. This yields the following expression for $N_i$ $$N_i=\text{round}(N_0(s_0-s_i+r_i-r_0)*10^3/c).$$

The above equations represent one embodiment of a process to calculate the integers. It will be understood that any expression may be used to compute these integers, provided the relationship to $t_c$ is consistently maintained for all the integers.

In the above description the assumption was made that the a-priori position was within 100 km of the true position, and the a-priori absolute time was within 1 minute of the true time. For all GPS satellites, the maximum pseudorange rate is ±800 m/s. Thus the maximum value of the error term $e_i$ will be 100 km+60s*0.8 km/s=148 km. This is less than half of one C/A code millisecond epoch (i.e., less than half of one integer millisecond) and the rounding operation used above will always yield the correct integers. In the disclosure with respect to FIG. 4, FIG. 5, FIG. 6, these two restrictions on a-priori position accuracy and a-priori time accuracy are removed.

If the a-priori position is not known to within 100 km, it will nonetheless be known to some finite accuracy limit. Similarly, if the a-priori absolute time is not known to within 1 minute it will be nonetheless be known to some finite accuracy limit. As described in the processes 200 and 300, any a-priori position and time estimate within the 100 km and 1 minute constraints will yield the correct integers, correct GPS receiver position, and correct absolute time. In an embodiment of the current invention, the space of all possible a-priori positions is divided into a 100 km×100 km lat-lon grid, with altitude assigned from a look-up table of topographical altitudes. Similarly the space of all possible a-priori absolute times is divided into 1-minute segments. This yields a set of all possible a-priori positions and times. The process 200 is used iteratively, with each of the possible a-priori position and time values from the set. When an a-priori position and time is found within 100 km and 1 minute of truth, then the a-posteriori residuals will be small, and the correct GPS receiver position and absolute time will be computed, as described above.

Figure 4:
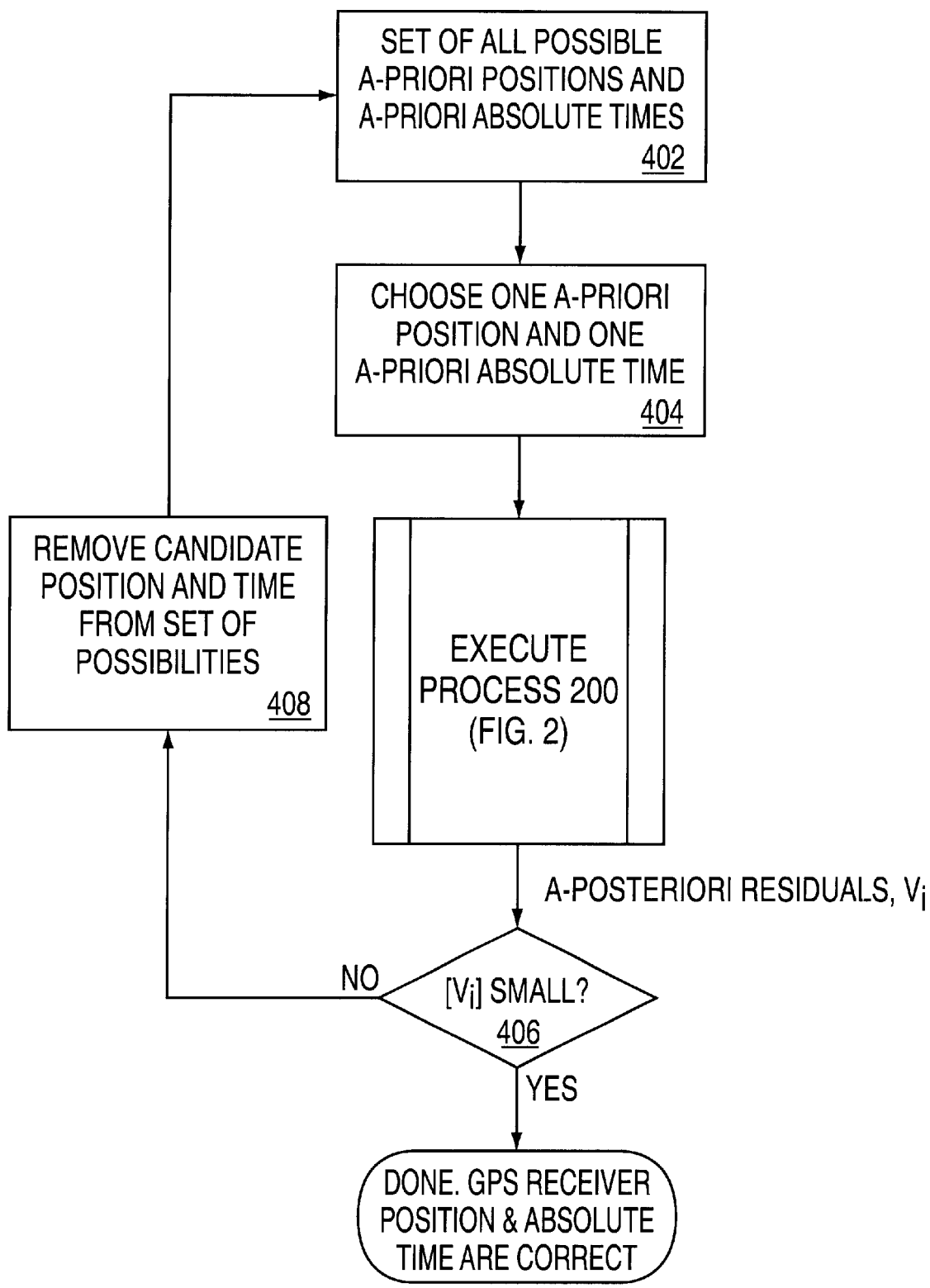
FIG. 4 depicts a flow diagram representing a method of computing receiver position and absolute time in an alternative embodiment of the invention.

An embodiment of this process 400 is shown in FIG. 4. At step 402, all possible a-priori positions and residuals are formed into a set. In one embodiment the set is organized as a 100 km×100 km grid, with altitudes assigned from a lookup table of topographical heights, and with time segmented into 1-minute segments. This is a convenient representation because, as discussed above, the combination of a 100 km grid plus the maximum pseudorange rate times 1-minute gives a maximum possible estimated error of just less than half a millisecond of range, which is necessary for the integer resolution process 300 to select the correct integers. However it will be understood that any number of different methods may be used to organize the set of all possible a-priori values, including creating new elements of the set dynamically, based on the results obtained from previously used values.

At step 404, the process 400 selects one possible a-priori position and time combination. These values are used in the process 200. At step 406, the process 400 examines the a-posteriori residuals that are produced in step 224 of FIG. 2. If the correct GPS receiver position and absolute time have been calculated, then the magnitude of the residuals will be small (that is, of the same order as the pseudorange measurement errors—tens of meters). If the a-priori position and time were far enough away from the truth that the integer ambiguities were not correctly resolved, then the residuals will be large (that is, of the order of one millisecond epoch—many kilometers). If the residuals are large then the candidate a-priori position and time are incorrect and they are removed from the set of possibilities. The process 400 is iterated until the correct position and absolute time are calculated.

It will be understood by those skilled in the art that even if the absolute time is available at the GPS receiver, the process of integer ambiguity resolution has traditionally required an initial estimate of position close enough to the true position for the integers to be uniquely defined by said initial estimate. The current invention provides a novel means of computing the correct integers without requiring an accurate initial estimate of position.

Figure 5B:
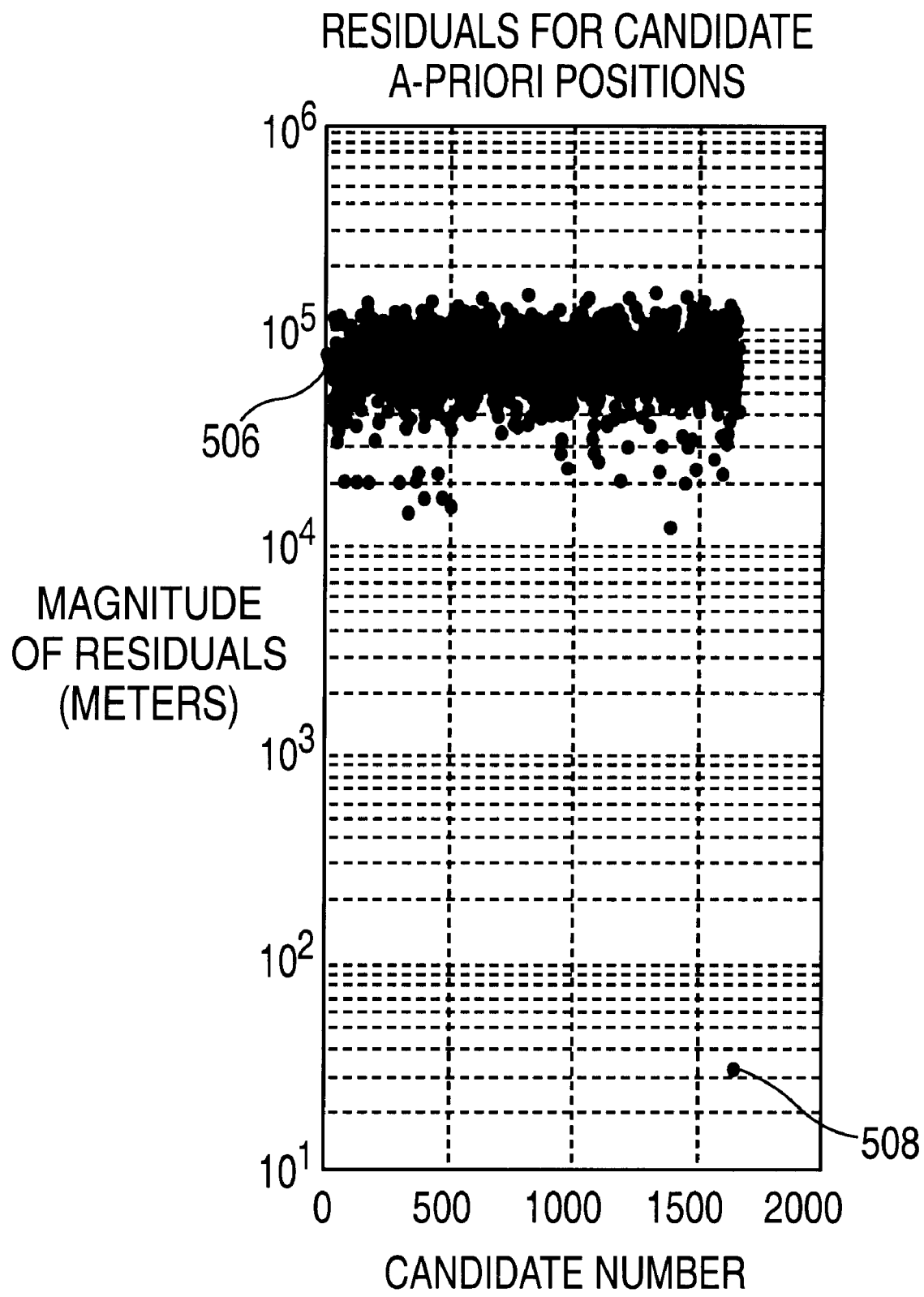

FIGS. 5A and 5B respectively depict a grid 502 used to determine receiver position in an embodiment of the invention and the residual magnitudes 506 computed during the position calculation process 200. In this example, the a-priori position is assigned as an arbitrary guess, in the middle of North America. Then the process 200 is performed for each possible a-priori position (grid point 504), and the magnitude of the a-posteriori residuals is examined. As each wrong candidate is rejected another candidate (another grid point 504) is generated by searching outwards on a 1 degree×1 degree grid 502. (Note that this 1 degree×1 degree grid is a slightly different embodiment than the 100 km ×100 km grid described earlier; both embodiments are guaranteed to give at least one a-priori position that will yield the correct integers, and hence the correct position and absolute time.) The a-priori position is completed by assigning an a-priori altitude from a lookup table of topographical heights. FIG. 5A shows the 1,663 wrong candidates on a grid 504 and FIG. 5B shows the corresponding residual magnitudes 506, each one of the order of an incorrect millisecond integer (i.e., many kilometers). Once the search reaches an a-priori position in the vicinity of the true position (in San Jose, Calif.) the mathematical model causes the correct result to "snap" into place, and the correct position and time are calculated. The a-priori position candidate number 1,664 (residual magnitude 508 and grid point 510) is approximately 175 km east of the true position, which, in this example is close enough for the position and time solution to "snap" into place. The correct solution yields a residual that is approximately 30 meters, which is from one thousand to ten thousand times smaller than the incorrect residuals.

The large difference between "small" residuals (tens of meters) and "large" residuals (tens to hundreds of kilometers) makes this embodiment work very well in practice. However, it will be understood that other methods may be used to test the quality of the result, including comparing the calculated position and absolute time to a position and time obtained through some other means—such as the location of the radio tower used in a wireless-aided system. It will also be appreciated that in order to have non-zero residuals, it is necessary to have more independent observations than unknowns. In the embodiments described thus far, there have been five unknown parameters: three coordinates of position, common mode error, and absolute time. Thus at least six independent measurements are required to have non-zero residuals. If six GPS satellites can be observed, then the six measurements can be obtained from them. If there are not six satellites observable then there are several steps that can be taken, many of which are standard in the art. The number of measurements may be increased by including measurements from other sources (such as range measurements based on time-of-arrival from a wireless system, or angle-of-arrival measurements measured in a wireless system, or any other independent measurement that can be obtained).

The number of observables can also be increased by including, as "pseudo-measurements", known constraints on position, for example known or approximately known altitude can be introduced into the mathematical model as a pseudo-measurement. In the embodiment specified above, where the mathematical model is represented by the equation $\underline{u}=H\underline{x}$, a pseudo-measurement for known altitude may be created by first specifying the a-priori position in coordinates of latitude, longitude, and altitude, then by setting the a-priori altitude to the known altitude, then by adding a new line to the matrix equation:

$$\begin{bmatrix} u \\ 0 \end{bmatrix} = \begin{bmatrix} H \\ 0 & 0 & 1 & 0 & 0 \end{bmatrix} x.$$

This approach effectively adds another measurement or observable to the mathematical model. This approach is standard in the art, and it is understood that it applies to any constraints that may be useful in solving for the unknown parameters.

Another approach is to reduce the number of unknown parameters. This may be performed by removing known, or approximately known parameters. The most commonly known parameter is altitude, and it can be removed from the mathematical model. Similarly the common mode error may be calibrated (for example, if the invention is implemented in a system with access to a stable oscillator) and removed from the mathematical model.

It will be appreciated that many combinations of the disclosed techniques may be applied to compute unknown values, including unknown absolute time.

For example, using the techniques of this invention, one can compute the time parameters alone, without computing the position. This is done, in the preferred embodiment, by fixing the position in the mathematical model to the a-priori position, and computing the remaining two unknown parameters: common mode error and absolute time.

Figure 6:
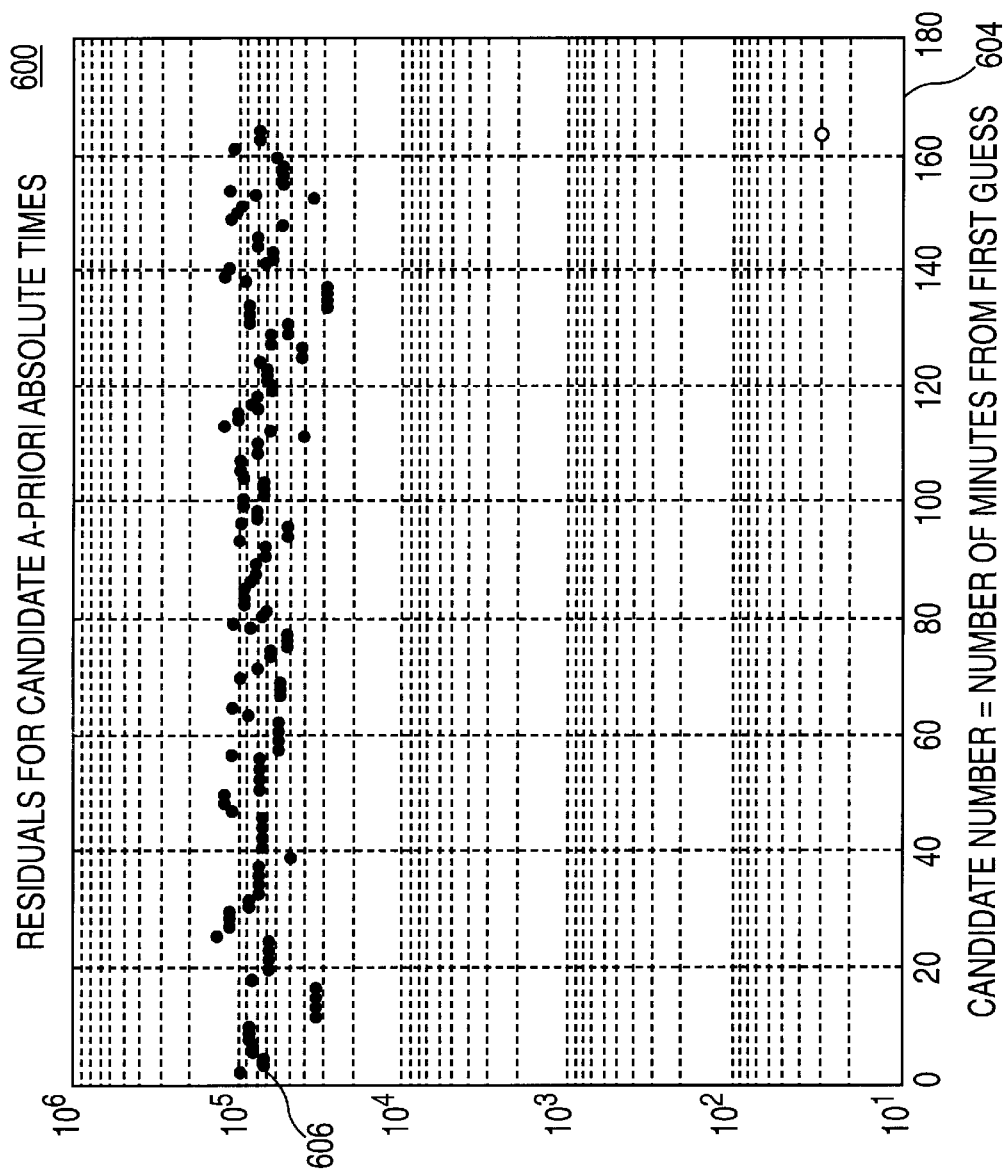
FIG. 6 depicts a graph of the residual time error used in computing an absolute time.

FIG. 6. is a graphical representation 600 of the residuals magnitudes (axis 602) associated with the different a-priori times (axis 604) that were attempted in an example embodiment of the invention. In this particular example, a range of possible times, each one-minute apart, is attempted for each of the grid points shown in FIG. 5. The first a-priori absolute time was chosen by guessing a time that turns out to be approximately two-and-a-half hours later than the true absolute time of reception. When the process 400 applies an a-priori position approximately 175 km away from the true position, and an a-priori time within one minute of the true absolute time, the mathematical model calculates the correct position and time, as shown in FIG. 5. In general, the mathematical model will calculate the correct position and time as soon as the a-priori position and time are close enough to cause process 300 to calculate the correct integers. As discussed, the preferred embodiment is guaranteed to find at least one such a-priori position and time, by creating an appropriate grid, and appropriately spaced time intervals.

Although the methods and apparatus of the present invention have been described with reference to GPS satellites, it will be appreciated that the teachings are equally applicable to positioning systems which utilize pseudolites or a combination of satellites and pseudolites. Pseudolites are ground based transmitters that broadcast a PN code (similar to the GPS signal) which may be modulated on an L-band carrier signal, generally synchronized with GPS time the term "satellite", as used herein, is intended to include pseudolites or equivalents of pseudolites, and the term "GPS signals", as used herein, is intended to include GPS-like signals from pseudolites or equivalents of pseudolites.

In the preceding discussion the invention has been described with reference to application upon the United States Global Positioning System (GPS). It should be evident, however, that these methods are equally applicable to similar satellite systems, and in particular, the Russian Glonass system and the European Galileo system. The term "GPS" used herein includes such alternative satellite positioning systems, including the Russian Glonass system and the European Galileo system.

Although various embodiments which incorporate the teachings of the present invention have been shown and described in detail herein, those skilled in the art can readily devise many other varied embodiments that still incorporate these teachings.

What is claimed is:

1. A method for calculating an absolute position of a GPS receiver and an absolute time of reception of satellite signals comprising:

providing pseudoranges that estimate the range of the GPS receiver to a plurality of GPS satellites;

providing an estimate of an absolute time of reception of a plurality of satellite signals;

providing an estimate of a position of the GPS receiver;

providing satellite ephemeris data;

computing absolute position and absolute time using said pseudoranges by updating said estimate of an absolute time and the estimate of position of the GPS receiver.

2. The method oc claim 1 wherein said pseudoreanges are sub-millisecond pseudoranges.

3. The method of claim 1, wherein a first instance of said estimate of absolute time is in error by more than 10 milliseconds.

4. The method of claim 1, wherein said estimate of absolute time is provided by a clock that is not linked to a GPS reference time.

5. The method of claim 1, wherein said estimates of position and absolute time may be arbitrary guesses.

6. The method of claim 1, further comprising:

forming a-priori pseudorange-residuals; and forming a mathematical model relating said a-priori pseudorange-residuals to said updates of said position and absolute time estimates; and computing updates of the position and absolute time that fit the mathematical model.

7. The method of claim 6, wherein said a-priori range-residuals are a difference between expected ranges, from said satellites to said a-priori position estimate, and the pseudoranges.

8. The method of claim 6, wherein said expected ranges are computed at a time given by said a priori time estimate.

9. The method of claim 6, wherein said mathematical model is a linearization of a Taylor series of a non-linear mathematical model.

10. The method of claim 9, wherein said linearization is of the form:

$$u_i=[\partial\rho_i/\partial x,\ \partial\rho_i/\partial y,\ \partial\rho_i/\partial z,\ \partial\rho_i/\partial t_C,\ \partial\rho_i/\partial t_S]*[x,\ y,\ z,\ t_C,\ t_S]^T$$

where:
- $u_i$ is the a-priori range-residual, for one satellite;
- $\rho_i$ is the pseudorange for a satellite i;
- x, y and z are three coordinates of position updates;
- $t_C$ is a common mode error update;
- $t_S$ is an absolute time of reception update; and
- $\partial$ adenotes the partial derivative.

11. The method of claim 4, wherein one or more of the updates is assumed known, so that the remaining updates may be computed.

12. The method of claim 10, wherein one or more of the updates x, y, z, or $t_C$ is assumed known, and set equal to an assumed value in the mathematical model, so that the remaining updates may be computed.

13. The method of claim 10, wherein one or more of the updates x, y, z, or $t_C$ is assumed known, and added to the model as a pseudo-measurement so that the remaining updates may be computed.

14. A process as in claim 6, wherein other measurements or constraints are used in the mathematical model.

15. A process as in claim 6, wherein said a-priori position is obtained from a location of a radio tower used to communicate with a mobile device containing said GPS receiver.

16. A process as in claim 6, wherein said absolute time estimate is obtained from a real time clock in a server, said server being located remotely from said GPS receiver.

17. A method for calculating absolute time of reception of satellite signals in a GPS receiver comprising:
- providing pseudoranges that estimate the range of the GPS receiver to a pluarlity of GPS satellites;
- providing an estimate of position of the GPS receiver; and
- computing absolute time using the pseudoranges and the position estimate.

18. The method of claim 1 wherein said pseudoranges are sub-millisecond pseudoranges.

19. The method of claim 17, further comprising:
- forming a-priori pseudorange-residuals; and
- forming a mathematical model relating said a-priori pseudorange-residuals to updates of said estimate of position and absolute time; and
- computing updates of the position and absolute time that fit the mathematical model.

20. The method of claim 19, wherein said a-priori range-residuals are a difference between expected ranges, from said satellites to said a-priori position estimate, and the pseudoranges.

21. The method of claim 19, wherein said expected ranges are computed at a time given by said a priori time estimate.

22. The method of claim 19, wherein said mathematical model is a linearization of a Taylor series of a non-linear mathematical model.

23. The method of claim 22, wherein said linearization is of the form:

$$u_i=[\partial\rho_i/\partial x,\ \partial\rho_i/\partial y,\ \partial\rho_i/\partial z,\ \partial\rho_i/\partial t_C,\ \partial\rho_i/\partial t_S]*[x,\ y,\ z,\ t_C,\ t_S]^T$$

where:
- $u_i$ is the a-priori range-residual, for one satellite;
- $\rho_i$ is the pseudorange for a satellite i;
- x, y and z are three coordinates of position updates;
- $t_C$ is a common mode error update;
- $t_S$ is an absolute time of reception update; and
- $\partial$ denotes the partial derivative.

24. The method of claim 23, wherein one or more of the updates x, y, z, or $t_C$ is assumed known, and set equal to an assumed value in the mathematical model, so that the remaining updates may be computed.

25. The method of claim 24, wherein one or more of the updates x, y, z, or $t_C$ is assumed known, and added to the model as a pseudo-measurement so that the remaining updates may be computed.

26. A process as in claim 24, wherein other measurements or constraints are used in the mathematical model.

27. A process as in claim 24, wherein said a-priori position is obtained from a location of a radio tower used to communicate with a mobile device containing said GPS receiver.

28. A method of calculating a GPS position for a GPS receiver from partial pseudoranges that have ambiguity in a number of integer milliseconds, comprising:
- a) choosing an a-priori position of the GPS receiver;
- b) calculating integers conforming to said a-priori position;
- c) calculating a navigation solution;
- d) calculating a-posteriori residuals; and
- e) using a relative size of said a-posteriori residuals to determine if said calculated integers are correct; and
- f) repeating steps c), d) and e) using another a-priori position until residuals having a magnitude below a predefined threshold are computed.

29. A method as in claim 28, wherein said a-priori position is not within a specified distance of the actual receiver position.

30. A method as in claim 28, wherein said a-priori position is greater than 100 km from the actual receiver position.

31. A method as in claim 28, wherein said a-priori position is greater than one integer millisecond from the actual receiver position.

32. A method as in claim 28, wherein said a-priori position is an arbitrary guess.

33. A system for computing an absolute position of a GPS receiver and an absolute time of reception of satellite signals comprising:
- a mobile device comprising a GPS receiver and a wireless transceiver;
- a server being in wireless communication with said mobile device;
- where said GPS receiver computes pseudoranges that estimate the range of the GPS receiver to a plurality of GPS satellites and the wireless transceiver transmits said pseudoranges to the server;
- where the server computes an absolute position and absolute time for the GPS receiver using the pseudoranges and an estimate of position and time.

34. The system of claim 33 wherein said pseudoranges are sub-millisecond pseudoranges.

35. The system of claim 33 wherein the position estimate is a position of a radio tower coupled to the server that receives signals from the wireless transceiver.

* * * * *

UNITED STATES PATENT AND TRADEMARK OFFICE
CERTIFICATE OF CORRECTION

PATENT NO. : 6,417,801 B1
DATED : July 9, 2002
INVENTOR(S) : Frank van Diggelen

It is certified that error appears in the above-identified patent and that said Letters Patent is hereby corrected as shown below:

Column 7,
Line 33, please change "$\partial \rho_i / \partial x_i \partial \rho_i / \partial y$" to -- $\partial \rho_i / \partial x$, $\partial \rho_i / \partial y$ --.

Column 8,
Line 48, please change "$N_0 * c/10^3 + s_0 t_C = r_0 - e_0$" to -- $N_0 * c/10^3 + s_0 - t_C = r_0 - e_0$ --.

Column 9,
Line 3, please change "$N_o * c/10^3 + s_i - t_C = r_i - e_i$" to -- $N_i * c/10^3 + s_i - t_C = r_i - e_i$ --.
Line 13, please change "$N_i = round(N_0(s_0 - s_i + r_t - r_0) * 10^3 / c$" to
-- $N_i = round(N_0(s_0 - s_i + r_i - r_0) * 10^3 / c)$ --.

Signed and Sealed this

Eleventh Day of February, 2003

JAMES E. ROGAN
*Director of the United States Patent and Trademark Office* though
US006417801C1

(12) INTER PARTES REEXAMINATION CERTIFICATE (511th)
United States Patent
van Diggelen

(10) Number: US 6,417,801 C1
(45) Certificate Issued: Jan. 15, 2013

(54) METHOD AND APPARATUS FOR TIME-FREE PROCESSING OF GPS SIGNALS

(75) Inventor: Frank van Diggelen, San Jose, CA (US)

(73) Assignee: Global Locate Inc., Glen Rock, NJ (US)

Reexamination Request:
No. 95/001,377, Jun. 8, 2010

Reexamination Certificate for:
Patent No.: 6,417,801
Issued: Jul. 9, 2002
Appl. No.: 09/715,860
Filed: Nov. 17, 2000

Certificate of Correction issued Feb. 11, 2003.

(51) Int. Cl.
*G01S 5/00* (2006.01)
*G01S 5/14* (2006.01)
*G01S 1/00* (2006.01)

(52) U.S. Cl. ......... 342/357.62; 342/357.25; 342/357.46; 342/357.64

(58) Field of Classification Search ................. None
See application file for complete search history.

(56) References Cited

To view the complete listing of prior art documents cited during the proceeding for Reexamination Control Number 95/001,377, please refer to the USPTO's public Patent Application Information Retrieval (PAIR) system under the Display References tab.

*Primary Examiner* — Peter C. English

(57) ABSTRACT

A method and apparatus for computing GPS receiver position without using absolute time information transmitted by the satellite or by an alternative source of timing available at the GPS receiver. The GPS receiver is contained in an integrated receiver that also includes a wireless communication transceiver, but does not have access to an accurate source of absolute time information. The wireless transceiver communicates through a wireless network to a server. The GPS receiver measures satellite pseudoranges and uses the wireless communication transceiver to send the pseudoranges to the server. The server fits the pseudoranges to a mathematical model in which the GPS receiver position and the absolute time are unknown parameters. The server then computes a position and absolute time that best fit the model, thus yielding the correct position for the GPS receiver, and the absolute time at which the pseudorange measurements were made.

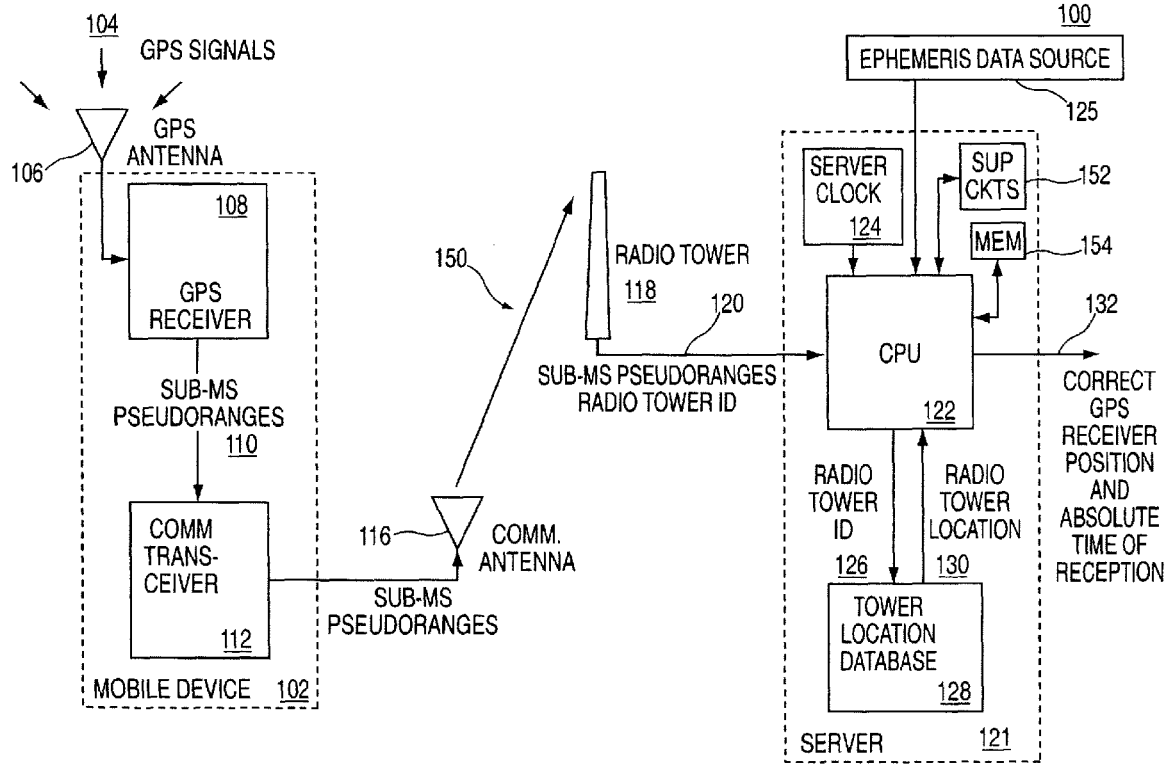

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 28-32 and 34 is confirmed.

Claims 1-27, 33 and 35 are cancelled.

\* \* \* \* \*